3,137,621
METHOD OF TREATING COLIC WITH
TRIHYDROXYACETOPHENONES
Louis Lafon, Paris, France, assignor to Societe Anonyme dite: Orsymonde, Paris, France, a French company
No Drawing. Original application Feb. 20, 1961, Ser. No. 90,169. Divided and this application Nov. 29, 1961, Ser. No. 155,790
6 Claims. (Cl. 167—55)

The present invention relates to substances represented by the formula:

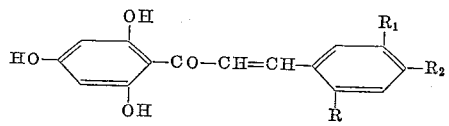

in which R, $R_1$ and $R_2$ can be the same or different and represent a hydrogen atom, a halogen atom, a hydroxy radical or an alkoxy radical.

The invention also concerns a process for preparing these substances, in which an aromatic aldehyde is added to trihydroxyacetophenone in the presence of a small quantity of hydrochloric acid and the product is subsequently purified after standing by maceration in cold acetic acid.

This process can be illustrated by the following equation:

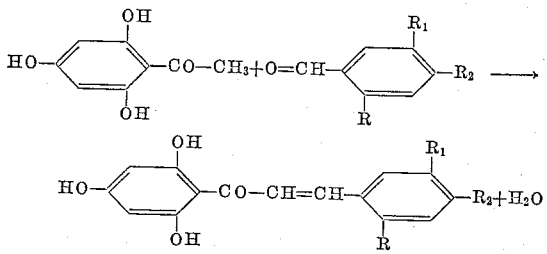

In which it will be seen a crotonisation (or

—CO—CH=CH— forming) reaction is carried out. This application is a division of our copending application Serial No. 90,169, filed Feb. 20, 1961.

Trihydroxyacetophenone, used as the starting material, can be obtained by treating phloroglycinol with acetonitrile in the presence of anhydrous hydrogen chloride and zinc chloride; the hydrochloride of cetimine thus formed is then hydrolysed by heating with water.

Trihydroxyacetophenone has the form of a pale yellow powder, slightly soluble in water, soluble in ether, very soluble in alcohol and insoluble in chloroform. Its melting point is 216°–218° C.

There are given below, by way of illustration, non-limiting examples of the process according to the invention, giving new substances:

EXAMPLE 1

*Benzylidene-trihydroxyacetophenone*

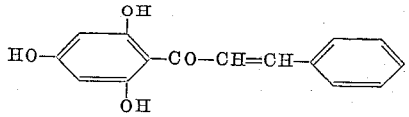

10.6 g. (0.1 mole) of freshly distilled benzaldehyde were added to 16.8 g. (0.1 mole) of trihydroxyacetophenone. The paste thus obtained was triturated with 2 x 3 ccs. hydrochloric acid and allowed to stand for 48 hours; it increased in weight and 15 ccs. acetic acid were then added by triturating and leaving it in contact for 3 days.

The product obtained was dried and carefully washed with water. It was dried and yielded 23 g. of a yellow-orange powder which turned brown around 230° C. and melted with decomposition at 270° C.

This powder is insoluble in water, slightly soluble in cold alcohol, more soluble in hot alcohol, soluble in ether and very soluble in chloroform.

The yield of the reaction is 90%.

Analysis: Calculated (percent), C=70.31, H=4.68. Found (percent), C=69.57, H=4.93.

This substance has some antispasmodic activity; also, it has a hypotensive effect and causes a decrease in intestinal peristalsis and choleresis in dogs at a dose of 50 mg./kg.

EXAMPLE 2

*Ortho-chlorobenzylidene-trihydroxyacetophenone*

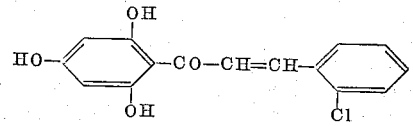

The same method was employed as described in Example 1, starting with 16.8 g. (0.1 mole) of trihydroxyacetophenone and 14.0 g. (0.1 mole) of ortho-chlorobenzaldehyde.

27.4 g. of a yellow powder were obtained, which is insoluble in water, slightly soluble in ether, chloroform and alcohol and more soluble in these materials in the hot.

The heated powder becomes brown around 185° C. but without melting even at 325° C.

The yield of the reaction is 95%.

Analysis: Calculated (percent), C=61.96, H=3.75. Found (percent), C=60.91, H=4.01.

This substance has an antispasmodic activity of the same order as the product of Example 1. Its toxicity is relatively low; its $DL_{50}$ by intraperitoneal administration in mice is 1.60 mg./kg.

In the dog anaesthetised with chloralose, the substance in a dose of 30 mg./kg. administered intravenously produces a slow hypotension persisting for 30 mins., together with an ephemeral decrease in peristalsis and a slight decrease in respiratory amplitude; a complete cessation of choleresis was noted at this dosage.

EXAMPLE 3

*Ortho-hydroxy benzylidene-trihydroxyacetophenone*

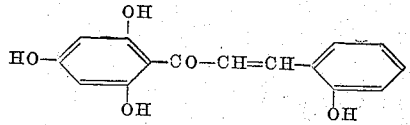

The same method was used as in Example 1, starting with 16.8 g. (0.1 mole) of trihydroxyacetophenone and 12.2 g. (0.1 mole) of salicaldehyde. 20 g. of a product soluble in acetic acid were obtained at the end of the preparation; it could be separated as by dilution of the acetic solution with water. It was purified by redissolving in 95% alcohol and precipitating with water.

A reddish-orange powder is obtained in this manner, which is insoluble in water, very soluble in acetone and alcohol, and soluble in acetic acid.

Its melting point is 172°–174° C.

The yield of the reaction is 75%.

Analysis: Calculated (percent), C=66.17, H=4.41. Found (percent), C=65.84, H=4.60.

This compound has an antispasmodic activity of the same order as that of the compounds of Examples 1 and 2.

EXAMPLE 4

*Vanillidene-trihydroxyacetophenone*

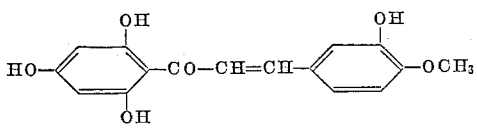

The method described in Example 1 was employed, starting with 16.8 g. (0.1 mole) of trihydroxyacetophenone and 15.2 g. (0.1 mole) of vanillin.

10 ccs. of a 1:5 solution of hydrochloric acid were used and a product was obtained which was dried and slowly washed with water and then with chloroform; it was dried and 26 g. of a yellow powder were obtained, which is insoluble in water, soluble in benzene and chloroform in the hot and very soluble in acetone and alcohol.

Its melting point is 220° C.

The yield of the reaction is 89%.

Analysis: Calculated (percent), C=63.15, H=5.26. Found (percent), C=62.87, H=5.45.

The latter substance has very good antispasmodic properties and can be used in the treatment of hepatic disorders and of nephritic colics.

EXAMPLE 5

*Parahydroxybenzylidene-trihydroxyacetophenone*

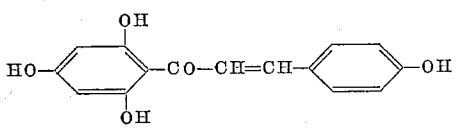

For this preparation, 16.8 g. trihydroxyacetophenone and 12.2 g. parahydroxybenzaldehyde (0.1 mole) were used and the method described in Example 1 was employed; 26,6 g. of product were obtained, namely 96% of the theoretical. This product has the form of a reddish-yellow powder, insoluble in water and soluble in alcohol, particularly hot; on heating, the powder turns brown around 210° C. and decomposes around 270° C.

Analysis: Calculated (percent), C=66.17, H=4.41. Found (percent), C=67.51, H=4.96.

EXAMPLE 6

*Meta-hydroxybenzylidene-trihydroxyacetophenone*

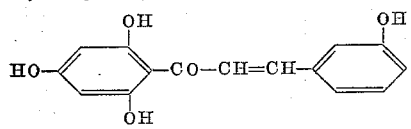

The general method was employed, with 16.8 g. trihydroxyacetophenone and 12.2 g. of metahydroxybenzaldehyde (0.1 mole). This produced 26 g. (or a yield of 95%) of product, which has the form of an orange powder, insoluble in water and soluble in acetone and alcohol; on heating, the powder turns brown around 230° C. and decomposes without melting at 272° C.

Analysis: Calculated (percent), C=66.17, H=4.41. Found (percent), C=65.20, H=4.65.

The compounds of Examples 5 and 6 have a very marked vasodilatory action, which is particularly so in relation to coronary sufferers.

EXAMPLE 7

*Parachlorobenzylidene-trihydroxyacetophenone*

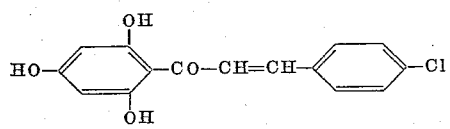

The general method was also employed, with 7.8 g. trihydroxyacetophenone and 14 g. parachlorobenzaldehyde (0.8 mole) and 27 g. (or a yield of 95%) of product were obtained, which has the form of a light yellow powder, insoluble in water, slightly soluble in benzene, soluble in alcohol and very soluble in ether and chloroform. On heating, the powder changes colour around 190° C. without melting. Its analysis gives:

Calculated (percent), C=61.96, H=3.75. Found (percent), C=60.15, H=3.97.

This compound has a certain antispasmodic activity, similar to that of its isomer in Example 2; however, the para derivative of the present example has a lower toxicity than its ortho isomer; the $DL_{50}$ by intraperitoneal administration in mice is 3.80 mg./kg.

Also in a dog anaesthetised with chloralose, the compound in a dose of 19 mg./kg. administered intravenously exerts a rapid, large, but ephemeral hypotension; it does not cause any cessation of choleresis.

The products obtained according to the invention are particularly interesting in therapeutics, where their antispasmodic and/or coronary vasodilative properties can be employed.

The compound of Example 4, namely vanillidenetrihydroxyacetophenone, is particularly interesting and a pharmacodynamic study carried out on this compound is given below.

The toxicity of this product has been studied, in the first place.

Female mice of the Webster strain have been used for this, weighing between 16 and 25 g. and maintained throughout the test in separate cages; these mice were fed and watered as desired.

The first tests carried out on 48 mice by intraperitoneal administration and it was observed that the average toxic dose of the product is 0.355 g./kg.; the toxicity was studied gastrically on 60 mice and it was observed after 7 days that the average toxic dose is 5.10 g./kg.

The antispasmodic action was then studied on isolated rat duodenum maintained alive by the Magnus method. For this the duodenum was maintained by immersion in oxygenated Tyrode liquid at a temperature of 32° C. and spasmogenic agents such as barium chloride and acetylcholine were used.

It was observed on the one hand that the spasm produced by 5 mg. barium chloride was diminished by 46% on adding 15 mg. of the product to the Tyrode bath (80 ccs.).

It was also observed on the other hand that the spasm produced by 10 gamma acetylcholine was diminished by 80% on the addition of 0.5 g. of the product to the Tyrode bath (60 ccs.); such an effect is identical with that obtained with papaverine.

Further studies were made to find whether the product likewise exerts an antispasmodic effect in situ and dogs anaesthetised with chloralose and subjected to artificial respiration were used for this; the peristaltic movements were recorded by the method of a balloon inserted in the duodenum and connected to a Marey capsule. Intestinal spasm was produced by intravenous injection of 3 mg./kg. barium chloride and it was observed that doses of 60 mg./kg. of the product were slightly active.

The cardiovascular effect of the product was also studied on dogs anaesthetised with chloralose and it was observed that doses of the order of 60 mg./kg. cause a drop in the carotid pressure of about 33%.

It was also studied whether such a hypotensive effect was the result of a cardiac action. The action of the product on the heart of the rabbit in situ was studied for this purpose. It was observed that such an action was not higher than the hypotensive effect of the solvent used, namely propylene glycol diluted to 25%. A dose of 7 mg./kg. of this product did not cause any cardiac depressive action.

Doses of 200 to 300 mg./kg. of the product were also used, which cause a diminution of the carotid pressure without having any cardiac hypotensive action.

The action of the product on the coronary output was then studied, using the Langendorff method on isolated rabbit heart; it was observed that a dose of 10 gamma, the product caused a decrease in the coronary output.

The action of the product was also studied on isolated guinea-pib ureter maintained alive in an analogous manner to that of the Magnus method used for the duodenum.

The pendular rhythmic movements of the ureter which resemble cardiac pulses which are observed on the heart of a mouse perfused by the method of Straub are accelerated and there can even be obtained a spasm with the aid of barium chloride which is subsequently added to the Tyrode bath. It was observed also that the product clearly exerts an antispasmodic action on the isolated ureter.

The action of the product on diuresis was also studied, utilizing the method of Lichfitz on a rat. It was noted that, as regards aqueous diuresis, the product causes an increase in the diuretic activity for doses of 1 to 1.5 g./kg.; however, the product does not modify the resorbtion of tubular chlorine and does not modify the pH at the doses used.

The choleretic action of the product was finally studied.

In the first place, the action was studied on chronic choleresis utilising the Ruteford technique on four dogs; a dose of 5 mg./kg. caused a decrease followed by an increase of choleresis; a dose of 10 mg./kg. caused an increase of choleresis; a dose of 10 mg./kg. caused an increase of choleresis in one case, and in another case, a diminution followed by a temporary increase of the biliary output, itself followed by a considerable decrease.

In the second test, the action on choleresis was studied in dogs having an acute choledoch fistula and it was observed that a dose of 10 mg./kg. caused a diminution in choleresis of 28%.

It was thus shown that the product has a very low toxicity administered bucally, that it exerts a musculotropic and neurotropic antispasmodic action, that it also exerts a hypotensive action and a diuretic action and finally that it diminishes choleresis.

While the compounds have not yet been established as effective in human therapy a first clinical study has enabled it to be shown that vanillidene-trihydroxyacetophenone has a spectacular antispasmodic activity, particularly in the treatment of nephritic colic and hepatic colic; it can be employed in doses of 0.10 g. absorbed 3 to 6 times per day.

This compound can be put up in the form of cachets, tablets, capsules or suppositories and glucose can be utilized as an excipient in association with 0.10 g. of the compound, in quantities from 0.10 to 0.60 g. It can also me made up in an injectable form being associated if desired with the product known as "Pluronic."

The compound of Example 5, namely parahydroxybenzylidene-trihydroxyacetophenone, is particularly interesting; it can be used in therapeutics because of its coronary vasodilatory action in the treatment of coronaritis and diseases due to peripheral vaso-constriction. In human medicine, a dose of 0.10 g. of the compound absorbed 3 to 4 times per day can be used.

A pharmacodynamic study of this compound is given below:

The acute toxicity of the compound by intraperitoneal administration has been determined on 56 female mice of the Webster strain, having weights ranging from 16 to 25 g. The animals were maintained throughout the whole of the period of observation (3 days) in individual cages. The product was administered to groups of 8 mice in doses ranging from 50 to 750 mg./kg. body weight.

The average mortal toxic dose, $DL_{50}$, has been determined by the graphic method of Tainter and Miller and appears to be 225 mg./kg.

The effect of the compound has also been studied on isolated organs: rat duodenum, guinea-pig ureter and coronary rabbit artery.

The rat duodenum was maintained alive by the Magnus method; oxygenated Tyrode liquid was maintained at a temperature of 32° C. The spasmogenic effect was produced either by means of a neurogenic agent, acetylcholine, or a musculotropic agent, barium chloride.

As regards the musculotropic effect, the spasm was induced by the addition to the Tyrode liquid of 0.16 mg. of barium chloride per 1 cc. of liquid; the compound in a dose of 1.60 mg./cc. alleviated the spasm.

As regards the neurotropic effect, the spasmogenic agent, acetylocholine, was utilised in a dose of 1.5 gammas/cc.

The compound is 4000 times less active than atropine sulphate used as a reference.

The guinea-pig ureter was maintained alive in a special Locke liquid (deprived of alkaline phosphates and magnesium chloride) at a temperature of 37° C. As the spasmogenic agent, barium chloride was used in a dose of 0.10 mg./cc. of liquid. No spasm was produced, but the rhythm and amplitude of the pendular movements increased.

A dose of 0.5 mg./cc. of compound does not modify the rhythm of periodic movements; on the contrary, it increased them. On the other hand, a dose of 0.83 mg./cc. diminished the amplitude and then produced a cessation of the automatic movements; thus the effect on the ureter is relatively weak.

On the coronary rabbit arteries, the Langendorff technique was utilised. A Van Dyke and Hastings solution was added to the Tyrode liquid, carbogen was substituted for oxygen; the vasodilative effect was produced by perfusing the heart with a Van Dyke and Hastings solution including barium chloride which produced a persistent and stable vasoconstriction.

Tests have been carried out on four hearts at concentrations varying from $1 \times 10^{-5}$ to $1 \times 10^{-7}$. It was always noted that the compound exerts a vasodilatory action which, compared with that of papaverine on 3 hearts, appeared to be 10 times greater. Also the effect of the compound is more lasting than that of papaverine.

The effect of the compound on organs in situ was also studied; rabbit heart, cat heart, dog duodenum and finally the carotid pressure of the dog.

On a rabbit anaethetised with urethane and subjected to artificial respiration, the standard suspension method was utilised, in which the compound is either in a gummy suspension or in solution in propylene glycol; simultaneously the carotid pressure was recorded by means of a very sensitive mercury manometer.

The tests were carried out on 3 rabbits.

In a dose of 10 mg./kg. of gummy suspension, the product caused a drop in carotid pressure of 20% which was fugitive, followed by a slow and progressive decrease of about 60%, at a maximum after 8 minutes, and then a progressive increase without return to the normal. Recording of the amplitudes of the auricle and ventricle showed a sharp decrease. A dose of 20 mg./kg., which produced a persistent and progressive drop in the pressure, exerts a decrease of the amplitude of the ventricle and then on that at the auricle, ending in cardiac failure 1 hour after injection.

In a dose of 1 mg./kg. dissolved in propylene glycol, the compound has no effect on the pressure, no effect on the ventricle and causes a slight decrease in the auricular amplitude. A dose of 2 mg./kg. which produces a drop in the pressure of 25%, also produces a slight and fugitive decrease in the auricular and ventricular amplitudes. Finally, a dose of 5 mg./kg., which produces a drop in pressure of 50%, is accompanied by a slight decrease in the auriculo-ventricular amplitude. It may be mentioned that on control animals, propylene glycol in the same concentration produces a less significant drop in pressure and decrease in amplitude.

A cat anaesthetised with nembutal was experimented upon by using the same technique of recording the movements of the auricle and ventricle by the suspension method and of the carotid pressure by means of a mercury manometer.

The test was carried out on 3 cats, which appeared to be more sensitive than the rabbit. The compound in a dose of 5 mg./kg. injected slowly in stabilised aqueous suspension at a concentration of $5 \times 10^{-3}$ produced a collapse of the arterial pressure and a decrease in the amplitude of the auricle and of the ventricle with auriculoventricular dissosiation; these effects were mortal.

On a second cat, a dose of 1 mg./kg. administered in aqueous solution at a concentration of $1 \times 10^{-3}$ produced a drop of 68% of the arterial pressure and a decrease of 50% in the amplitudes of the auricle and the ventricle. These phenomena are reversible.

The renewed administration of 1 mg./kg. effected 90 minutes after the first injection produced a lesser effect; the drop of carotid pressure was only 50%, the decrease in the amplitude of the auricle was only 30% and that of the ventricle was 17%. It seems that the repetition of the effects gives rise immediately to a tachyphylaxic phenomenon.

The tachyphylaxia is confirmed by the fact that subsequent administration of 2 mg./kg. only diminishes the pressure by 36% and does not modify the auriculoventricular action; in addition, injections of 5 mg./kg. and 10 mg./kg. appear then to be ineffective.

On a third cat, the hypotensive and temporary cardiac depressive effects of 1 mg./kg. of the compound were confirmed.

The vascular effect of the compound was confirmed on 5 mongrel dogs normotensively anaesthetised with chloralose and on which the carotid pressure was recorded by the standard method by use of a Ludwig manometer.

A dose of 1 mg./kg. exerts a drop in carotid pressure which varies according to the animal from 34 to 80%. A dose of 5 mg./kg. is likewise hypotensive and non-toxic. A dose of 13 mg./kg. administered intravenously appears to be lethal.

On the same dogs, the respiratory effect was recorded by connecting a tracheal canulla to a Marey capsule.

Doses of 1 and 5 mg./kg. produced a temporary decrease of the respiratory amplitude with acceleration of the rhythm.

The action on duodenal peristalsis of a dog anaesthetised with chloralose was studied by the standard method of a balloon inserted in the duodenum and connected to a Marey capsule.

A dose of 1 mg./kg. increased the peristalsis. At a dose of 5 mg./kg., however, a decrease of peristalsis was noted which continued until paralysis set in, but this was temporary.

The modifying action of a compound on the biliary flux in the dog has been studied according to two different methods, namely, acute choledoch fistula and chronic choledoch fistula.

On a dog anaesthetised with chloralose, a polyethylene probe was introduced into the choledoch duct, after ligature of the cystic duct. When the biliary flux was stabilised, which was generally observed 2 hours after anaesthetising with chloralose, the biliary output was recorded by means of an electric drop-counter, connected to an electromagnetic stylus inscribing upon a kymograph.

Even a dose of 1 mg./kg. decreased the biliary flux. A dose of 5 mg./kg. on another dog provoked an analogous effect.

For chronic choledoch fistula, the choledoch duct was catheterised in a first stage under general anaesthesia, after having ligatured the cystic duct which eliminates vesicular bile. The choledoch duct was catheterised by means of a polyethylene probe of 1 mm. diameter which was connected externally after suture to the abdominal wall in the sub-cutaneous region. Each day the animal received 50 cc. of beef bile included in a rich paste of chopped raw meat.

After 1 or 2 weeks, the animal was taken for physiological testing. First, the base choleresis was determined by measuring the volume of bile eliminated every 15 minutes until it become constant. Then the compound was injected intravenously in doses of 2 mg./kg. to 3 animals; the compound was a gum-stabilised 1% suspension.

In three cases, there was obtained a diminution of choleresis varying from 20 to 65%, but this diminution in choleresis is not stable.

The diuretic effect was studied on 3 dogs anaesthetised with chloralose, after ureteral catheterisation by means of a polyethylene probe. Recording of the drops was effected by means of an electric drop-counter utilizing the same device as that mentioned above.

In a dose of 1 mg./kg. in 1 case, an increase of 20% in the diuresis was noted, in a second case an increase of 20 to 60% in the diuresis which persisted for 1 hour; in a third case, a decrease of diuresis was obtained, on the other hand; a dose of 5 mg./kg. employed on 2 dogs always caused diminution of diuresis.

The pharmacodynamic study was completed by determining the modifying action with regard to two peripheral poisons, adrenalin and acetylcholine, the effect of which was recorded on a dog normotensively anaesthetised with chloralose.

Doses of the compound varying between 1 and 5 mg./kg. did not modify either the hypertensive effect of adrenalin nor the hypotensive effect of acetylcholine.

The compound does not have any effect on the central nervous system; it is neither analgesic nor ataraxic in a strong dose, but does exert a hypothermisic effect on mice.

The compound of Example 6, namely metahydroxybenzylidene-trihydroxyacetophenone, likewise has a very clear vasodilatory action.

A pharmacodynamic study of this compound is given below.

The acute toxicity of the compound was determined on 40 mice of the Webster strain, weighing from 15 to 20 g. An aqueous suspension of the compound stabilised by gum at 5% was utilised which was injected to 5 groups of 8 mice.

The $DL_{50}$ is 300 mg./kg. The limits of toxicity in 19/20 of the cases varied between 244 and 367 mg./kg.

The effect of the compound has been studied on the intestinal system.

On isolated rat duodenum, the standard Magnus technique was used, in which the organ was maintained at a temperature of $+32°$ C.

The antispasmodic musculotropic and neurotropic effects were successively recorded.

The musculotropic spasmogenic agent was barium chloride dissolved in a dose of 0.16 mg./cc. in oxygenated Tyrode.

The compound in a dose of 1.6 mg./kg. exerts an action comparable with that of the compound of Example 5.

The antispasmodic neutropic effect was studied on the same preparation utilising acetylcholine in a dose of 0.16 gamma/cc. as the spasmogenic agent.

In a dose of 1.6 mg./cc., the compound decreases the spasm produced by acetylcholine by more than 50%, the compound having an effect 18,000 times less than that of atropine sulphate.

The effect of the compound on peristalsis was studied by the standard method of a rubber balloon in contact with a Marey capsule by means of a probe.

Experiments have been carried out on a dog anaesthetised with chloralose which minimises the inhibition of peristalsis by anaesthesia. Experiments were carried out on 3 mongrel dogs using different doses administered intravenously.

Even a dose of 1 mg./kg. decreases the tonus and peristaltic movements; a dose of 10 mg./kg. is even more active and a dose of 16 mg./kg. is even more active and a dose of 16 mg./kg. completely retards peristalsis during a period of 13 minutes and it is necessary to wait a further 30 minutes to observe a return to normal.

Another test in vivo has been carried out to determine the effect of the compound on the parasympathetic system, in particular on salivary secretion.

For this purpose, the secretory effect of mecholyl on the Harderian glands in the rat has been studied (Hamburger, Cahen and Tvede). Although in all the control animals the haematoporphyric secretion (chromodacryorrhea) appeared after intraperitoneal injection of mecholyl, previous injection of the compound in a dose of 0.150 g./kg. administered intraperitoneally prevented this action in 50% of the rats 20 to 30 minutes after injection and lasted for more than 60 minutes. A higher dose of 250 mg./kg. showed activity on 75% of the animals. This effect is similar to that obtained in another group of animals of 0.03 mg./kg. of atropine sulphate administered introperitoneally.

The diuretic effect was studied using two different techniques on two species of animals; the rat and the dog.

The diuretic effect was determined on the rat in accordance with the method of Lipschitz, Hadidian and Kerpsar, modified by R. Cahen (Jour. Amer. Pharm. Ass., Scient. Ed. 1947, 36, pp. 139–144). It consists in determining the volume, the urinary excretion and the reabsorption of chlorine.

White rats were utilised, of the male sex and Wistar strain, weighing from 130 to 160 g. The animals were deprived of food and water for 18 hours and were grouped in sizes in metabolic cages having the bottom furnished with a screen, for permitting flow of urine into a graduated receiver. All the animals were rehydrated before the experiment by gastric administration of physiological serum.

Before beginning the experiment, the bladder was emptied by excretion and either the compound or a reference was then administered bucally. Determination of the diuretic effect was then carried out from the hourly urinary elimination and the volume eliminated was measured by means of a graduated receiver. The experiment was carried out on a group of six animals for each of the doses studied. It was carried out in comparison with two groups of controls which had only received gastrically administered physiological serum. Finally, the tests were carried out in comparison with a reference material, acetazolamide.

The compound was administered gastrically in doses of 500 mg. and 1 g./kg., the reference being utilised in doses of 15 mg. and 30 mg./kg., also administered gastrically.

The measurement of urinary volume allowed the horal urinary output to be established, i.e., the volume excreted per hour. It also allowed establishment of the urinary elimination and diuretic activity.

Determination of the urinary volume allowed determination in the first place of the urinary excretion, which is the ratio of the volume of urine eliminated and the volume of physiological serum administered to the rat.

This allows the diuretic activity then to be established as calculated from the ratio of the urinary excretion of the animals subjected to testing to that of the controls receiving only physiological serum on the same day.

The chloruria was determined on samples taken every two hours. The method of determination utilised is that of Charpentier-Volhard. The results were expressed in microequivalents per per minute.

It appears that the compound in a dose of 500 mg./kg. exerts a diuretic activity comparable to that of 15 or 30 mg./kg. of acetazolamide. A dose of 1 g./kg. of the compound exerts a lesser effect, but still greater than that of the controls.

The determination of the horal urinary output allows it to be established that the maximum effect of the compound is observed at the end of 1 to 2 hours; that of acetazolamide is observed at the end of one hour.

The compound in a dose of 0.50 g./kg. slightly increases the chloruria during the first hour; on the other hand, confirming the standard information, acetazolamide produces no hyperchloruria.

In addition, the effect of the compound on the motility of the ureter has been studied. An isolated guinea-pig ureter was used for this purpose, maintained alive by a technique analogous to that of Magnus, in a special Locke liquid deprived of magnesium salts and phosphates.

The contraction stimulating agent was barium chloride in a dose of 0.10 mg./cc. which on an organ substantially deprived of peristalsis produces periodic pendular contractions.

The addition of the compounds to the organ previously treated with barium chloride, even in a dose of 0.75 mg./cc., only slightly modifies the effect.

The effect of the compound has also been studied on hepato-biliary secretion in the dog.

On an animal anaesthetised with chloralose, the biliary flux was recorded after the choleretic effect of the chloralose has dissipated.

Under anaesthesia, the choledoch duct was catheterised after ligature of the cystic duct. In general, choleresis is stabilised 2 hours after the onset of anaesthesia. The base choleresis was observed, the product was injected and the biliary flux was measured every 15 minutes. The biliary output is measured by means of an electric dropcounter in relation to a stylus inscribing on a kymograph.

The study was carried out on 3 dogs to which the compound was administered intravenously in a dose of 1 mg./kg. In this case, a diminution of choleresis was observed which was at a maximum after 30 minutes but persisted for more than one hour.

On another dog, a dose of 10 mg./kg. also diminished choleresis. Finally, a third dog reecived 13 mg./kg. intravenously and the biliary flux was likewise decreased.

These experiments have been conformed by determining the biliary flux on animals with a chronic choledoch fistula.

For this purpose, after having effected fistulation of the choledoch duct and ligature of the cystic duct under anaesthesia, the animals were released and the bile which had flowed into a probe supported externally by suture to the abdominal wall was recovered after 1 or 2 weeks. The volume was measured by means of a graduated receiver. The biliary constituents were also determined, namely bilirubin, cholic acid and cholesterol.

Experiments have been carried out on a dog which had received intravenously 2 mg./kg. of the compound in a 1% suspension a diminution of choleresis of 26% was observed during ½ hour and the effect was prolonged during ¾ hour. It was observed that the concentration of the biliary constituents remained the same but, because of the diminution of biliary volume, there was a diminution in the volume of the bilirubin, cholic acid and cholesterol.

The effect of the compound on the respiratory system was studied in 3 dogs anaesthetised with chloralose in which the variation in the respiratory amplitude and volume were recorded by means of a Marey capsule in relation to a trachael canulla. Doses of 1–5 and 10 mg./kg. diminished the respiratory rhythm but slightly increased the amplitude.

The effect of the compound on the cardiac system has been studied in the cat anaesthetised with nembutal. Contractions of the auricle and ventricle were recorded independently by the suspension method.

In a dose of 5 mg./kg. administered intravenously, the compound produces a slight decrease of the auricular and ventricular amplitude; however, the effect is reversed and disappears after 8 minutes. It is interested to note that this test gave rise to a tachyphylaxic phenomenon. The first injection diminished the amplitude by 70%, but the second given 10 minutes after the first only reduced the amplitude by 42%.

It may be mentioned that this weak and reversible effect does not prohibit the compound from being used in human medicine.

The vascular effect of the compound has been studied on the dog and the cat normotensively by utilizing the standard method of recording the carotid pressure by means of a Ludwig manometer.

Experiments carried out on 2 cats have shown that a dose of 5 mg./kg. produces a diminution of the pressure of 24%, a dose of 10 mg./kg. produces a drop of 63%; injection repeated 1 hour after the first dose produced a lesser effect; the hypotension being only 36%.

On 3 dogs, the hypotensive effect of the compound has been confirmed; even a dose of 1 mg./kg. produced a weak hypotension (16%). On the other hand, a dose of 13 mg./kg. produced a considerable drop in the pressure.

On a dog anaesthetised with chloralose, the modifying effect of the compound on the vascular effect of adrenalin and acetylcholine was also studied. Even at a dose of 13 mg./kg. which produced a considerable hypotension, the compound did not modify either the hypertensive effect of adrenalin or the hypotensive effect of acetylcholine.

On isolated rabbit ear perfused by the Pissenski method, the vasodilative effect of the compound was first confirmed and then the modifying effect was studied in relation to a poison such as barium chloride.

The standard method of Pissenski was used. The flow output was measured with precision by means of an electric drop-counter in relation to a recording stylus inscribing on a kymograph. The experiment was carried out at laboratory temperature, but the perfusion liquid was a special Locke solution deprived of magnesium and phosphate, which thus allowed incorporation of barium chloride in a dose of 1.5 mg./cc.

In 4 tests, it was established that the compound increases the perfusion output of a preparation which had thus been subjected to the vasoconstrictive effect of barium chloride. A dose of 1.5 gammas/cc. of the compound exerts a vasodilatory effect of 30 to 48%.

Study of the compound was completed by examination of the effect on the coronary vessels of the rabbit.

The method utilised was that of Langendorff involving perfusion of the rabbit heart. This method has been rendered more sensitive and constant, (a) by subsituting, for the Ringer liquid, a Van Dyke and Hastings solution through which a carbogen stream is bubbled, (b) by producing a vasoconstriction by dissolution in the Van Dyke and Hastings liquid of barium chloride in a concentration of $1.5 \times 10^{-4}$.

The tests were carried out on 4 hearts. In all cases, it was apparent that the compound exerted a very pronounced coronary vasodilatory action. At a concentration of $1 \times 10^{-4}$, the effect could be compared with that of papaverine hydrochloride at a concentration of $2 \times 10^{-6}$. The compound is approximately 5 times more active than papaverine.

From the qualitative point of view, it is interesting to note that the effect of the compound is more prolonged than that of papaverine.

The two compounds of Examples 5 and 6 can be utilised in therapeutics in forms similar to those mentioned for the compound of Example 4.

What is claimed is:

1. A method of treating animals suffering from colic which comprises administering to such animals a pharmaceutical composition the essential active ingredient of which is an antispasmodic agent of the formula:

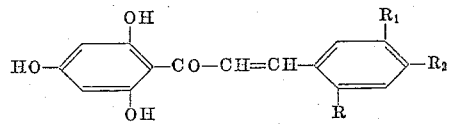

wherein R, $R_1$ and $R_2$ are each selected from the group consisting of hydrogen atoms, halogen atoms, hydroxy and lower alkoxy, in the amount of 0.10 to 1 gram in a pharmaceutical carrier.

2. A method of treating animals suffering from nephritic colic which comprises administering to such animals a pharmaceutical composition the essential active ingredient of which is an antispasmodic agent of the formula:

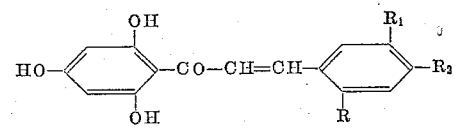

wherein R, $R_1$ and $R_2$ are each selected from the group consisting of hydrogen atoms, halogen atoms, hydroxy and lower alkoxy, in the amount of 0.10 to 1 gram in a pharmaceutical carrier.

3. A method of treating animals suffering from hepatic colic which comprises administering to such animals a pharmaceutical composition the essential active ingredient of which is an antispasmodic agent of the formula:

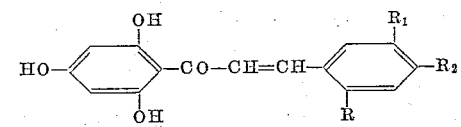

wherein R, $R_1$ and $R_2$ are each selected from the group consisting of hydrogen atoms, halogen atoms, hydroxy and lower alkoxy, in the amount of 0.10 to 1 gram in a pharmaceutical carrier.

4. A method of treating animals suffering from colic which comprises administering to such animals a pharmaceutical composition the essential active ingredient of which is vanillidene - trihydroxyacetophenone in the amount of 0.10 to 1 gram in a pharmaceutical carrier.

5. A method of treating animals suffering from colic which comprises administering to such animals a pharmaceutical composition the essential active ingredient of which is p-hydroxybenzylidene-trihydroxyacetophenone in the amount of 0.20 to 0.60 gram in a pharmaceutical carrier.

6. A method of treating animals suffering from colic which comprises administering to such animals a pharmaceutical composition the essential active ingredient of which is m-hydroxybenzylidene-trihydroxyacetophenone in the amount of 0.10 to 1 gram in a pharmaceutical carrier.

References Cited in the file of this patent

Inagaki: Chem. Abst. vol. 51, 1957, page 3833f.
Chem. Abs., Formanek, vol. 53, 1959, page 15380.